US012553273B2

(12) United States Patent
Kaneda et al.

(10) Patent No.: US 12,553,273 B2
(45) Date of Patent: Feb. 17, 2026

(54) DOOR OPENING AND CLOSING ASSISTING APPARATUS

(71) Applicant: HONDA MOTOR CO., LTD., Tokyo (JP)

(72) Inventors: Toshihiro Kaneda, Tokyo (JP); Mitsunori Nishino, Tokyo (JP); Nobuyuki Kishikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 272 days.

(21) Appl. No.: 18/174,873

(22) Filed: Feb. 27, 2023

(65) Prior Publication Data

US 2023/0287725 A1 Sep. 14, 2023

(30) Foreign Application Priority Data

Mar. 10, 2022 (JP) ................................ 2022-037186

(51) Int. Cl.
*E05F 15/622* (2015.01)

(52) U.S. Cl.
CPC ..... *E05F 15/622* (2015.01); *E05Y 2400/3015* (2024.05); *E05Y 2400/36* (2013.01); *E05Y 2900/531* (2013.01)

(58) Field of Classification Search
None
See application file for complete search history.

(56) References Cited

U.S. PATENT DOCUMENTS

2015/0280635 A1 10/2015 Fujimoto et al.
2016/0026191 A1 * 1/2016 Fujimoto ................ H02P 31/00 701/49

(Continued)

FOREIGN PATENT DOCUMENTS

CN 104948060 A 9/2015
CN 112302464 A 2/2021

(Continued)

OTHER PUBLICATIONS

Japanese Office Action received in corresponding Japanese application No. 2022-037186 dated Nov. 14, 2023 with English translation (4 pages).

(Continued)

*Primary Examiner* — Jelani A Smith
*Assistant Examiner* — Davin Seol
(74) *Attorney, Agent, or Firm* — Rankin, Hill & Clark LLP

(57) ABSTRACT

A door opening and closing assisting apparatus includes: an information obtainer that obtains information on an opening and closing velocity of a door on a vehicle; a door actuator that performs driving for assisting the opening and closing operation of the door; a target assisting power computer that computes a target assisting power for assisting the opening and closing operation of the door; and a controller that performs driving control for the door actuator based on the target assisting power. The target assisting power computer calculates, based on the opening and closing velocity of the door obtained by the information obtainer, a standard assisting power which is assisting power required to maintain the opening and closing velocity, makes a correction by decreasing the calculated standard assisting power according to a predetermined rule, and sets the standard assisting power after the decrease correction as the target assisting power.

6 Claims, 6 Drawing Sheets

(56) References Cited

U.S. PATENT DOCUMENTS

| | | | | |
|---|---|---|---|---|
| 2017/0081900 | A1 | 3/2017 | Watanabe et al. | |
| 2018/0291666 | A1* | 10/2018 | Linden | E05F 5/025 |
| 2018/0363353 | A1* | 12/2018 | Ghannam | E05B 77/02 |
| 2020/0235695 | A1* | 7/2020 | Asano | E05F 3/224 |
| 2022/0290481 | A1* | 9/2022 | Kromer | E05F 15/627 |
| 2023/0243199 | A1* | 8/2023 | Semineth | E05F 15/40 49/28 |

FOREIGN PATENT DOCUMENTS

| | | | | |
|---|---|---|---|---|
| CN | 113027285 | A | | 6/2021 |
| DE | 102020132908 | A1 | * | 6/2022 |
| JP | S57-126717 | A | | 8/1982 |
| JP | S61-216984 | A | | 9/1986 |
| JP | 2005-146599 | A | | 6/2005 |
| JP | 2005-171575 | A | | 6/2005 |
| JP | 2007-009650 | A | | 1/2007 |
| JP | 2007-238014 | A | | 9/2007 |
| JP | 2008095406 | A | * | 4/2008 |
| JP | 2015-203238 | A | | 11/2015 |
| JP | 2015-229868 | A | | 12/2015 |
| JP | 2019039148 | A | * | 3/2019 |
| JP | 2022190503 | A | * | 12/2022 |

OTHER PUBLICATIONS

Chinese Office Action received in corresponding Chinese application No. 202310147592.9 dated Jul. 26, 2025 and English translation (19 pages).

* cited by examiner (a) OPENING OPERATION (b) CLOSING OPERATION

DOOR OPENING AND CLOSING ASSISTING APPARATUS

CROSS-REFERENCE TO RELATED APPLICATION

This application claims the benefit of foreign priority to Japanese Patent Application No. 2022-037186, filed on Mar. 10, 2022, which is incorporated by reference in its entirety.

TECHNICAL FIELD

The present invention relates to a door opening and closing assisting apparatus that assists in opening and closing of a door on a vehicle.

BACKGROUND

There is conventionally known a door opening and closing assisting apparatus that assists in opening and closing of a door by applying an assisting power to a door opening and closing operation power exerted by an occupant of a vehicle (see JP2007-238014A). The door opening and closing assisting apparatus according to JP2007-238014A includes a torque sensor that detects a door opening and closing operation power exerted to a door knob on a vehicle, a velocity sensor that detects the velocity of opening and closing of the door, a motor that assists the door opening and closing operation power, and a controller that controls the motor using an assisting power instruction value computed from the door opening and closing operation power and the opening and closing velocity. The controller computes the assisting power instruction value based on the mass of the door, a viscous friction coefficient determined by the relation between a viscous friction force acting on the door and a moving velocity, and a virtual mass and a virtual viscosity friction coefficient for attaining ideal operability.

The door opening and closing assisting apparatus according to JP2007-238014A computes the assisting power instruction value based on the opening and closing operation power and opening and closing velocity of the door and controls the motor based on the assisting power instruction value obtained as a result of the computation. Thus, the control logic is established with a small number of parameters, and therefore, setting, development, and the like can be done readily with a clear configuration.

Meanwhile, in order for a door opening and closing assisting apparatus like the one disclosed in JP2007-238014A to be used widely, not only favorable operability for opening and closing the door, but also simplicity of the configuration of the apparatus is demanded.

In this regard, the door opening and closing assisting apparatus according to JP2007-238014A has room for improvement in terms of achieving favorable operability for opening and closing a door with a simple apparatus configuration.

The present invention has been made to solve the above problem and has an object to provide a door opening and closing assisting apparatus capable of achieving favorable operability for door opening and closing with a simple apparatus configuration.

SUMMARY

To achieve the above object, one aspect of the present invention is mainly characterized as a door opening and closing assisting apparatus that assists an opening and closing operation of a door on a vehicle, the door opening and closing assisting apparatus including: an information obtainer that obtains information on an opening and closing velocity of the door; a door actuator that performs driving for assisting the opening and closing operation of the door; a target assisting power computer that computes a target assisting power for assisting the opening and closing operation of the door; and a controller that performs driving control for the door actuator based on the target assisting power, in which the target assisting power computer calculates, based on the opening and closing velocity of the door obtained by the information obtainer, a standard assisting power which is assisting power required to maintain the opening and closing velocity, makes a correction by decreasing the calculated standard assisting power according to a predetermined rule, and sets the standard assisting power after the decrease correction as the target assisting power.

BRIEF DESCRIPTION OF THE DRAWINGS

The drawings described herein are for illustration purposes only and are not intended to limit the scope of the present invention in any way.

DETAILED DESCRIPTION

Figure 1A:
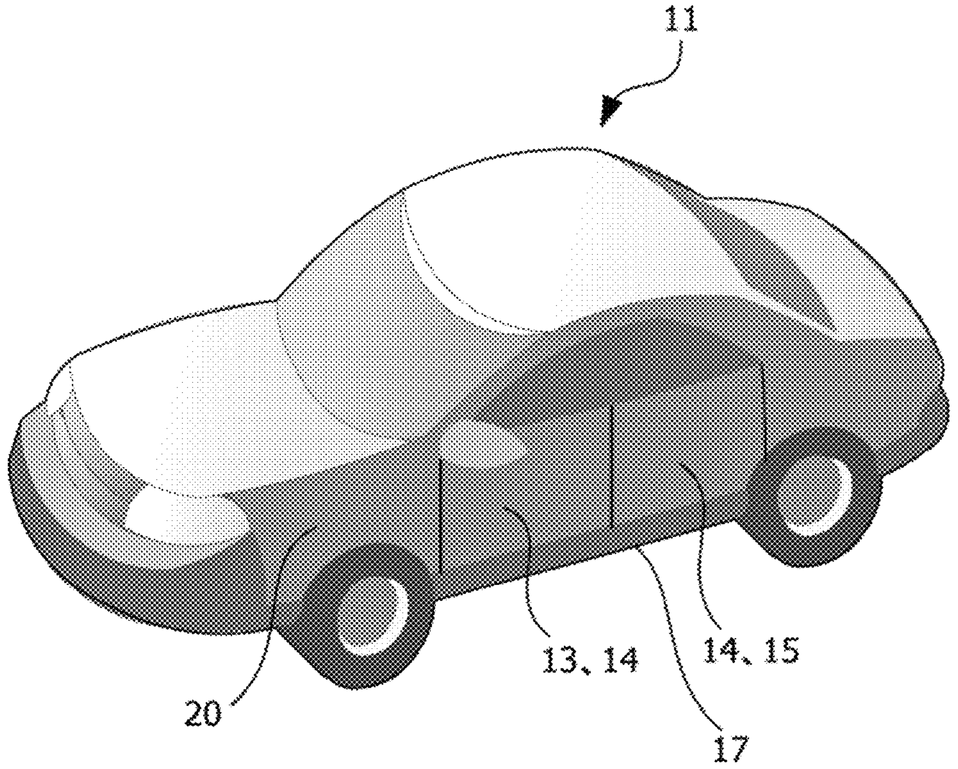
FIG. 1A is a perspective view of an outer appearance of a vehicle equipped with a door opening and closing assisting apparatus according to an embodiment of the present invention.

Referring to the drawings as needed, the following provides a detailed description of a door opening and closing assisting apparatus according to an embodiment of the present invention.

Note that throughout the drawings to be referred to below, members having the same function are denoted by the same reference sign. Also, the size and shape of a member may be schematically shown and may be modified or exaggerated for explanatory convenience.

When a description is given using directions, the directions are based on the front and rear, left and right, and up and down as seen from a driver sitting in the driver's seat (the front right seat) unless otherwise noted. In other words, a "front-back direction" corresponds to a "vehicle length direction," a "left and right direction" corresponds to a "vehicle width direction," and an "up-down direction" corresponds to a "vehicle height direction."

In the description of a vehicle 11 equipped with a door opening and closing assisting apparatus 10 according to the embodiment of the present invention, a plurality of members forming the vehicle body of the vehicle 11 are formed using a metal material such as a steel plate, unless otherwise noted.

[Configuration of Door Opening and Closing Assisting Apparatus 10]

First, the configuration of the vehicle 11 equipped with the door opening and closing assisting apparatus 10 according to the embodiment of the present invention is described with reference to FIGS. 1A and 1B as needed.

Figure 2:
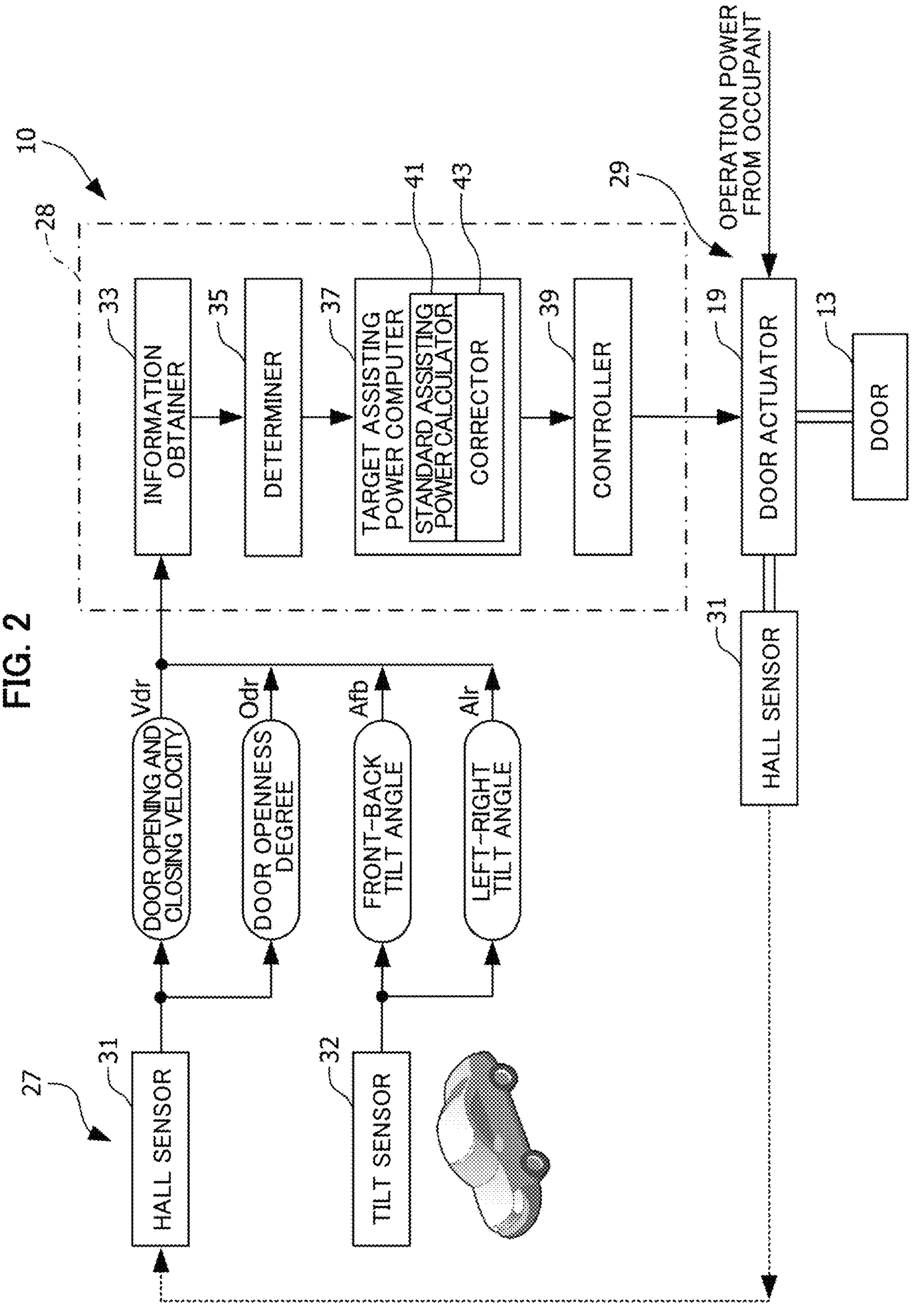
FIG. 2 is a functional block configuration diagram of the door opening and closing assisting apparatus according to the embodiment of the present invention.
Figure 3A:
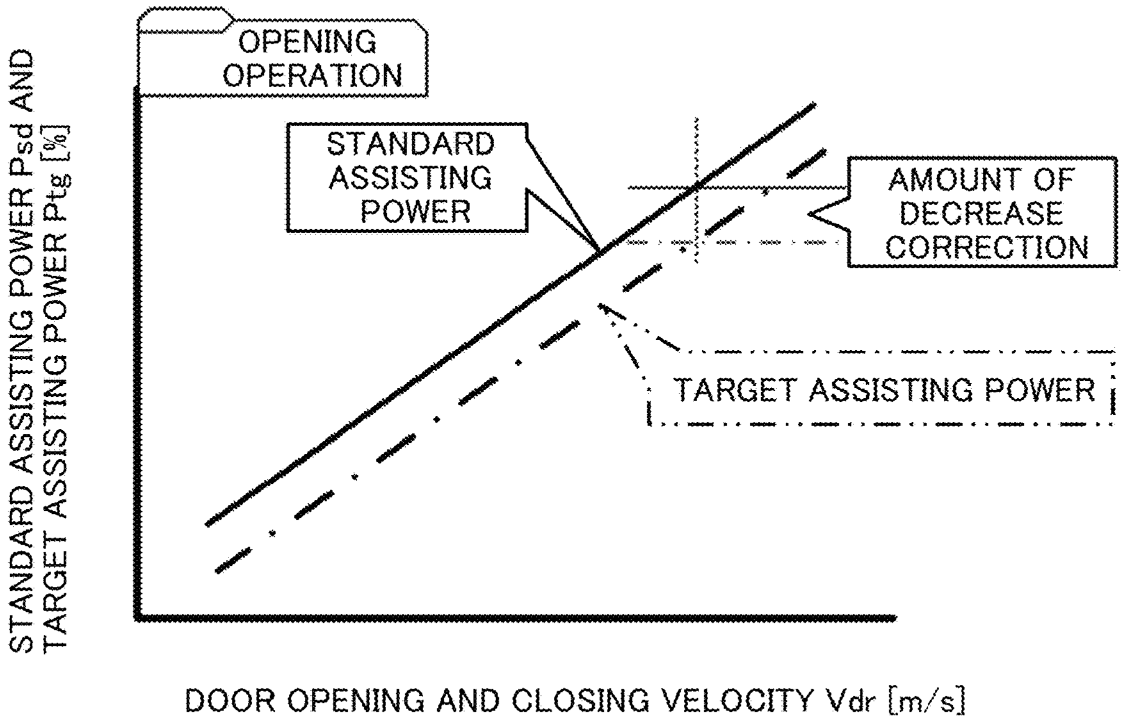
FIG. 3A includes a diagram (a) conceptually showing, in contradistinction, the relation between a standard assisting power and a target assisting power in a door opening operation with the door opening and closing velocity being changed and a diagram (b) conceptually showing, in contradistinction, the relation between the standard assisting power and the target assisting power in a door closing operation with the door opening and closing velocity being changed.
Figure 3A:
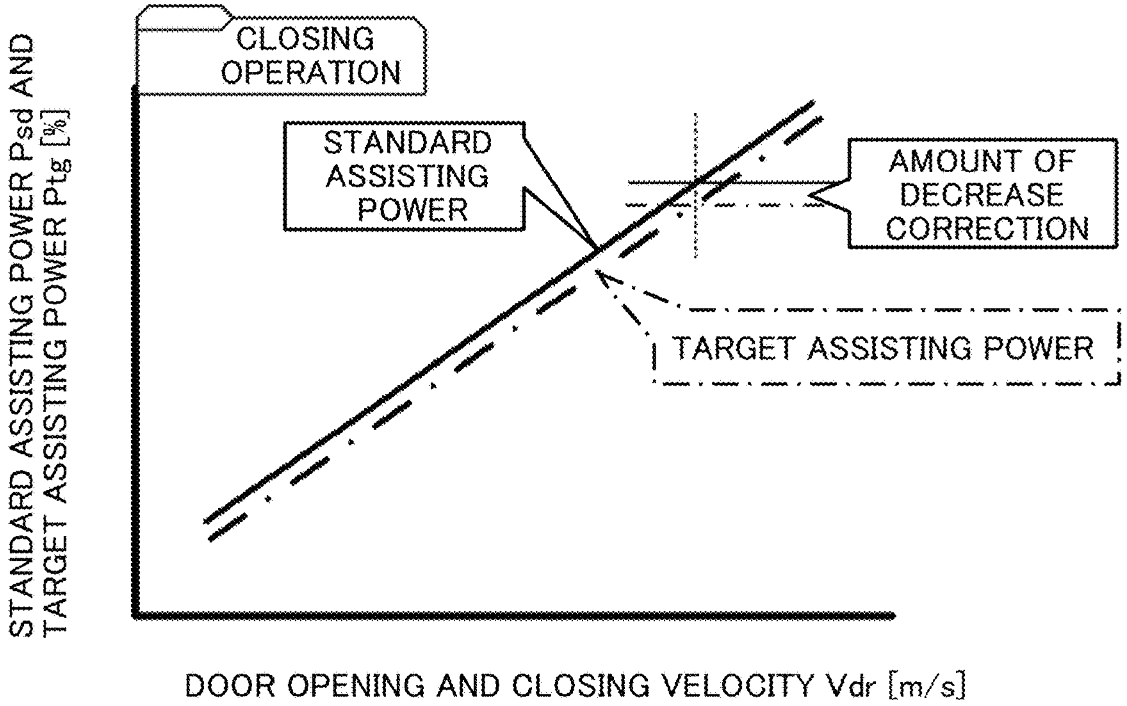
Figure 3B:
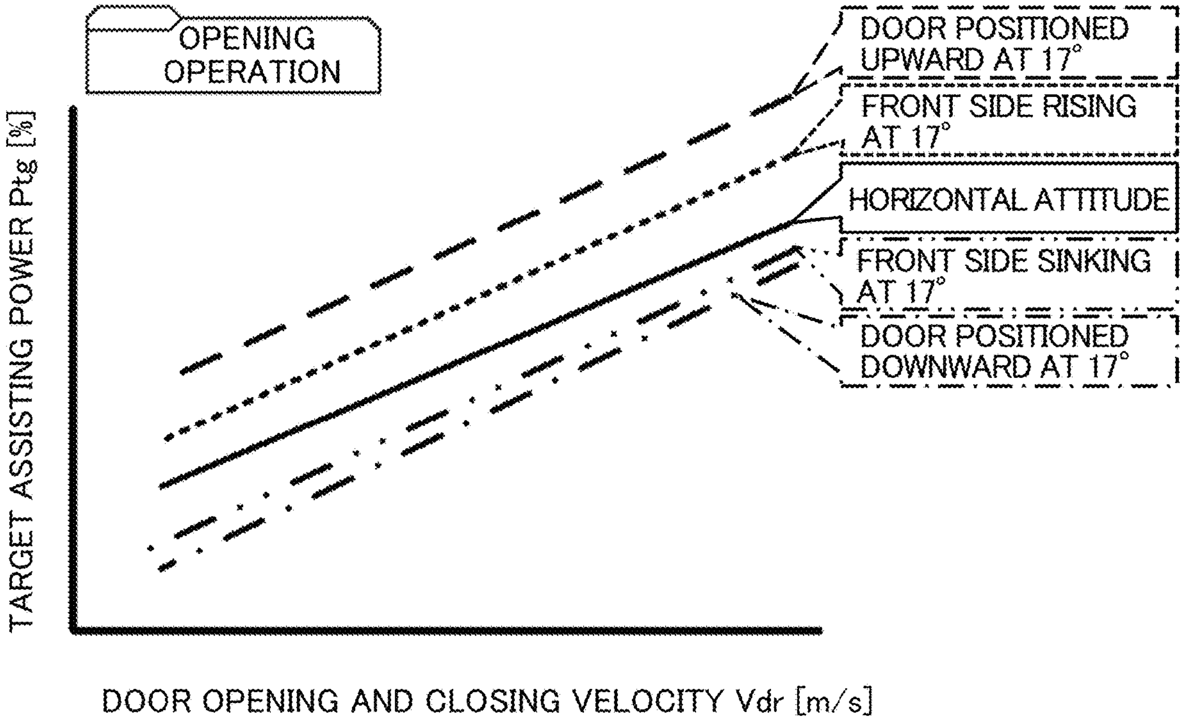
FIG. 3B is a diagram conceptually showing, in contradistinction, the relation of the target assisting power to the opening and closing velocity of the door for each of variously changed attitudes of the vehicle in a door opening operation.
Figure 3C:
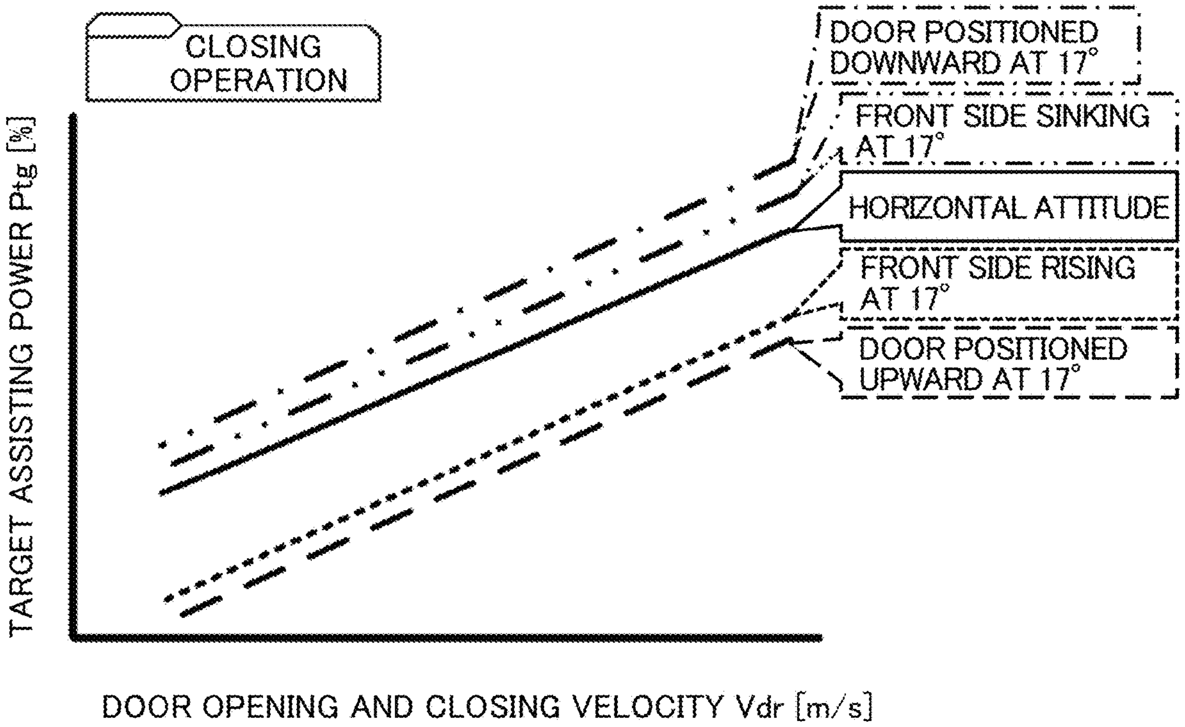
FIG. 3C is a diagram conceptually showing, in contradistinction, the relation of the target assisting power to the opening and closing velocity of the door for each of variously changed attitudes of the vehicle in a door closing operation.

FIG. 1A is a perspective view of an outer appearance of the vehicle 11 equipped with the door opening and closing assisting apparatus 10 according to the embodiment of the present invention. FIG. 1B is a perspective view showing how the door opening and closing assisting apparatus 10 is attached to a door 13. FIG. 2 is a functional block configuration diagram of the door opening and closing assisting apparatus 10. In FIG. 3A, (a) is a diagram conceptually showing, in contradistinction, the relation between a standard assisting power Psd and a target assisting power Ptg in a door opening operation with the door opening and closing velocity being changed, and (b) is a diagram conceptually showing, in contradistinction, the relation between the standard assisting power Psd and the target assisting power Ptg in a door closing operation with the door opening and closing velocity being changed. FIG. 3B is a diagram conceptually showing, in contradistinction, the relation of the target assisting power Ptg to an opening and closing velocity Vdr of a door 14 for each of variously changed attitudes of the vehicle 11 in an opening operation of the door 14. FIG. 3C is a diagram conceptually showing, in contradistinction, the relation of the target assisting power Ptg to the opening and closing velocity Vdr of the door 14 for each of variously changed attitudes of the vehicle 11 in a closing operation of the door 14.

As shown in FIG. 1A, the vehicle 11 equipped with the door opening and closing assisting apparatus 10 according to the embodiment of the present invention includes, on its sides, left and right front seat doors 13, left and right rear seat doors 15, and left and right side sills 17. Note that the front seat doors 13 and the rear seat doors 15 are collectively called "doors 14" in the following description unless a distinction therebetween is necessary.

Figure 1B:
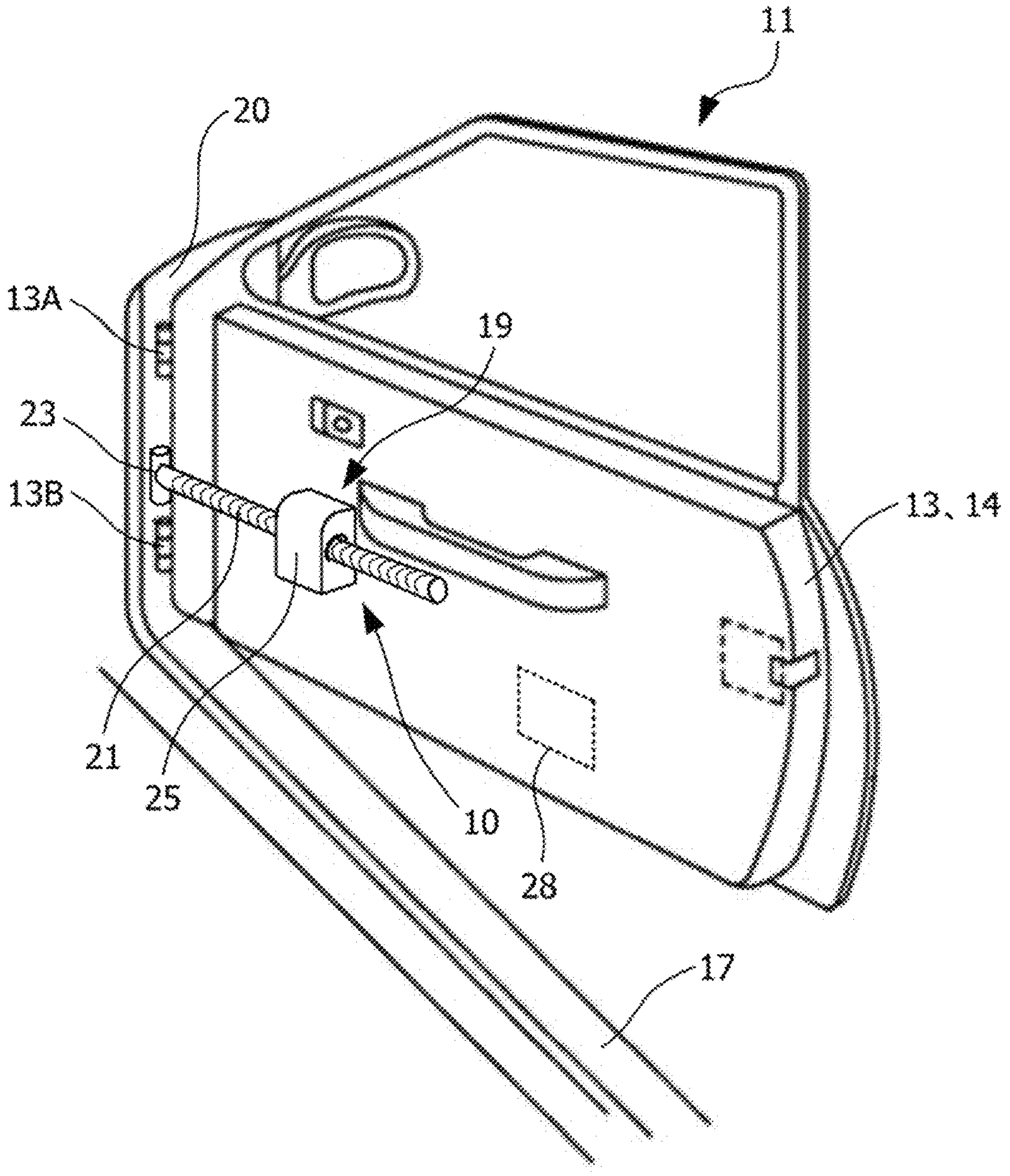
FIG. 1B is a perspective view showing how the door opening and closing assisting apparatus is attached to a door.

As shown in FIG. 1B, the front seat doors 13 (the doors 14) are each swingably attached to a vehicle body 20 via a pair of hinge mechanisms 13A and 13B, so that the front seat door 13 is freely openable and closable. The doors 14 are each provided with a door actuator 19 of the door opening and closing assisting apparatus 10, the door actuator 19 performing driving for assisting an opening and closing operation of the door 14.

As shown in FIG. 1B, the door actuator 19 is configured including a spindle screw 21 having a screw groove axially formed in its outer circumference and a motor device 25 having a spindle nut (not shown) having a screw groove formed in its inner circumference to threadably engage with the screw groove on the spindle screw 21, the spindle nut being connected to a rotor (not shown) via a speed reduction mechanism (not shown).

One end of the spindle screw 21 is pivotally supported via a joint mechanism 23 provided on the vehicle body 20. The other end of the spindle screw 21 is provided with the motor device 25. The motor device 25 is fixedly provided on the inner side of the door 14.

In the door opening and closing assisting apparatus 10 according to the embodiment of the present invention, when an occupant performs an operation for opening and closing the door 14, the door actuator 19 is actuated by the opening and closing movement of the door 14 caused by the opening and closing operation.

For instance, in a case where an occupant performs an operation for opening the door 14, the door 14 undergoes opening movement caused by the opening operation. In response to this opening movement of the door 14, the rotor of the motor device 25 provided at the free end of the spindle screw 21 is mechanically driven and rotated. When no electric power is being fed to the motor device 25, the motor device 25 serves to hinder the opening movement of the door 14 as a power generation device.

When the motor device 25 is supplied with electric power so that the opening movement of the door 14 may be performed, assisting power enabled by this electric power supply is applied to the operation power exerted by the occupant.

The door opening and closing assisting apparatus 10 according to the embodiment of the present invention calculates, based on the opening and closing velocity Vdr of the door 14, a standard assisting power Psd which is assisting power required to maintain the opening and closing velocity Vdr, makes a correction by decreasing the calculated standard assisting power Psd according to a predetermined rule, and sets the standard assisting power Psd after the decrease correction as a target assisting power Ptg, thereby achieving favorable operability for opening and closing the door 14 with a simple apparatus configuration. Details of this will be described sequentially.

To implement the functions described above, the door opening and closing assisting apparatus 10 according to the embodiment of the present invention is configured including, as shown in FIG. 2, functional units belonging to each of an input system 27, an information processing system (door ECU) 28, and an output system 29.

The functional units belonging to the input system 27 are configured including a Hall sensor 31 and an tilt sensor 32.

The Hall sensor 31 outputs detection signals including chronological information on the rotation position and rotation velocity of the rotor of the motor device 25 belonging to the door actuator 19.

Output signals from the Hall sensor 31 are converted into chronological information on the opening and closing velocity Vdr and the openness degree Odr of the door 14 and then sequentially sent to an information obtainer 33 belonging to the door ECU 28.

Note that as the openness degree Odr of the door 14, the current position of the door 14 in a relative coordinate system can be expressed by, for example, setting a definition range by allocating a numeric value "0" to a fully closed (closed) state and a numeric value "100" to a fully opened state (a state where the door is opened to the utmost limit) and assigning appropriate numeric values 1 to 99 to the current open/close positions.

The tilt sensor 32 outputs detection signals indicative of tilt angles about two axis directions, i.e., a detection signal indicative of a roll angle and a detection signal indicative of a pitch angle. When the front-back direction and the left-right direction (the vehicle width direction) of the vehicle 11 located on a horizontal plane are an x-axis direction and a y-axis direction, respectively, the roll angle is a rotation angle about the x-axis as a rotary axis, and the pitch angle is a rotation angle about the y-axis as a rotary axis.

The output signals from the tilt sensor 32 are converted into chronological information on a front-back tilt angle Afb and a left-right tilt angle Alr and then sequentially sent to the information obtainer 33 belonging to the door ECU 28.

Note that, as the front-back tilt angle Afb, the attitude (tilt angle) of the vehicle 11 in the front-back direction in a relative coordinate system can be expressed by, for example, assigning a numeric value "0" to the horizontal state, a positive numeric value to a frontward tilting state, and a negative numeric value to a rearward tilting state.

Similarly, as the left-right tilt angle Alr, the attitude (tilt angle) of the vehicle 11 in the left-right direction in a relative coordinate system can be expressed by, for example, assigning a numeric value "0" to the horizontal state, a positive numeric value to a leftward tilting state, and a negative numeric value to a rightward tilting state.

Functional units belonging to the information processing system (door ECU) 28 are configured including the information obtainer 33, a determiner 35, a target assisting power computer 37, and a controller 39.

The information obtainer 33 obtains the chronological information on the opening and closing velocity Vdr and the openness degree Odr of the door 14 based on the output signals from the Hall sensor 31 as well as the chronological information on the front-back tilt angle Afb and the left-right tilt angle Alr based on the output signals from the tilt sensor 32.

The chronological information obtained by the information obtainer 33, namely the chronological information on the opening and closing velocity Vdr and the openness degree Odr of the door 14 and the chronological information on the front-back tilt angle Afb and the left-right tilt angle Alr, are sent to the determiner 35.

The determiner 35 not only determines the direction of the opening and closing operation of the door 14, but also determines whether the opening and closing velocity Vdr of the door 14 is below a predetermined velocity threshold Vdrth.

The direction of the opening and closing operation of the door 14 may be obtained based on whether the sign of the difference between the openness degrees Odr that are a certain temporal interval apart from each other in the chronological information on the openness degree Odr of the door 14 is positive or negative.

The determination result on the direction of the opening and closing operation of the door 14 obtained by the determiner 35 is sent to the target assisting power computer 37.

Also, the determination result obtained by the determiner 35 on whether the opening and closing velocity Vdr of the door 14 is below the predetermined velocity threshold Vdrth is sent to the controller 39.

If assisting power from the door actuator 19 continues to be applied until the opening and closing velocity Vdr of the door 14 becomes zero, the occupant may experience a strange feeling as if the door 14 is coasting against their will.

Thus, it is desirable to stop the driving control of the door actuator 19 at a timing at which the opening and closing movement of the door 14 is about to end. A situation where the occupant may experience a strange feeling as if the door 14 is coasting against their will is thereby avoided.

Thus, as the predetermined velocity threshold Vdrth, for example, an opening and closing velocity Vdr of the door 14 (except for zero) indicating that the opening and closing movement of the door 14 is expected to end soon may be appropriately set.

Note that the determiner 35 may determine that the opening and closing velocity Vdr of the door 14 is below the predetermined velocity threshold Vdrth when the opening and closing velocity Vdr of the door 14 stays below the predetermined velocity threshold Vdrth for a predetermine period of time. This configuration is expected to offer an effect of avoiding a situation where driving control of the door actuator 19 is erroneously stopped precociously by mistiming the end of the opening or closing movement of the door 14.

The target assisting power computer 37 computes the target assisting power Ptg for assisting an opening or closing operation of the door 14.

To be more specific, the target assisting power computer 37 is configured including: a standard assisting power calculator 41 that calculates the standard assisting power Psd based on the opening and closing velocity Vdr of the door 14 obtained by the information obtainer 33, the standard assisting power Psd being assisting power required to maintain the opening and closing velocity Vdr; and a corrector 43 that makes a correction by decreasing, according to a predetermined rule, the standard assisting power Psd calculated by the standard assisting power calculator 41.

The target assisting power computer 37 sets the standard assisting power Psd after the decrease correction made by the corrector 43 as the target assisting power Ptg. This allows the occupant's power of opening and closing the door 14 to be assisted properly, not too much or too little. As a result, favorable operability for opening and closing the door 14 can be achieved with a simple apparatus configuration.

The target assisting power Ptg, which is a computation result obtained by the target assisting power computer 37, is sent to the controller 39.

The correction by decreasing the standard assisting power Psd according to a predetermined rule is, for example, a concept including both of a mode of obtaining the target assisting power Ptg by multiplying the standard assisting power Psd by a predetermined decrease rate (e.g., approximately 3% to 20%) and a mode of obtaining the target assisting power Ptg by subtracting a predetermined value (e.g., a value corresponding to approximately 3% to 20%) from the standard assisting power Psd.

Note that there are no particular limitations for the standard assisting power Psd and the target assisting power Ptg, but for example, they can be obtained using a mode involving an output duty ratio [%].

Also, as shown in, for example, (a) and (b) of FIG. 3A in contradistinction, the corrector 43 belonging to the target assisting power computer 37 makes a correction so that the amount of the decrease correction may be smaller for a closing operation of the door 14 than for an opening operation of the door 14.

Thus, a situation where the door 14 hits the next vehicle in the opening operation of the door 14 is less likely to occur, and an experience of speedy closing of the door 14 can be offered in the closing operation of the door 14.

The corrector 43 belonging to the target assisting power computer 37 further makes a correction by adjusting one or both of the standard assisting power Psd and the correction amount (decrease or increase) based on information on the attitude of the vehicle 11 including front-back and left-right tilts.

To be more specific, as shown in FIG. 3B, in a case where a force that hinders the open state of the door 14 is exerted in the opening operation of the door 14 due to a change in the attitude of the vehicle 11 (the door positioned upward at 17 degrees; the front side rising at 17 degrees), a correction is made so that the target assisting power Ptg may be larger than in a case where the vehicle 11 has a horizontal attitude. By contrast, in a case where a force that promotes the open state of the door 14 is exerted due to a change in the attitude of the vehicle 11 (the door positioned downward at 17 degrees; the front side sinking at 17 degrees), a correction is made so that the target assisting power Ptg may be smaller than in a case where the vehicle 11 has a horizontal attitude. Note that these corrections are made by adjusting one or both of the standard assisting power Psd and the correction amount (decrease or increase).

Also, the correction for making the target assisting power Ptg smaller or larger due to a change in the attitude of the vehicle 11 may be made using a combined correction amount obtained by adding and combining a correction amount for the front-back tilt angle Afb and a correction amount for the left-right tilt angle Alr that have been independently obtained.

Meanwhile, as shown in FIG. 3C, in a case where a force that hinders the closed state of the door 14 is exerted in the closing operation of the door 14 due to a change in the attitude of the vehicle 11 (the door positioned downward at 17 degrees; the front side sinking at 17 degrees), a correction is made so that the target assisting power Ptg may be larger than in a case where the vehicle 11 has a horizontal attitude. By contrast, in a case where a force that promotes the closed state of the door 14 is exerted due to a change in the attitude of the vehicle 11 (the door positioned upward at 17 degrees; the front side rising at 17 degrees), a correction is made so that the target assisting power Ptg may be smaller than in a case where the vehicle 11 has a horizontal attitude. Note that this correction is made by adjusting one or both of the standard assisting power Psd and the correction amount (decrease or increase).

Also, the correction for making the target assisting power Ptg smaller or larger due to a change in the attitude of the vehicle 11 may be made using a combined correction amount obtained by adding and combining a correction amount for the front-back tilt angle Afb and a correction amount for the left-right tilt angle Alr that have been independently obtained.

For the correction made by adjusting one or both of the standard assisting power Psd and the decrease correction amount, in actuality, characteristics tables (or conversion formulae) for the target assisting power Ptg that changes according to a change in the door opening and closing velocity Vdr are prepared in advance according to operation modes (opening and closing) of the door 14 and according to changes in the attitude of the vehicle 11. The characteristics tables (conversion formulae) to be referred to are switched and used for each individual case (such as, for example, the door 14 is being operated to be open, the door 14 is positioned upward, and the vehicle 11 has a front rising attitude).

Favorable operability for opening and closing the door 14 is thus achieved with a simple apparatus configuration.

Because the corrector 43 belonging to the target assisting power computer 37 thus makes a correction by adjusting one or both of the standard assisting power Psd and the amount of decrease correction based on information on the attitude of the vehicle 11 including front-back and left-right tilts, driving control of the door actuator 19 is performed using the target assisting power Ptg of a magnitude suited to the change in the attitude of the vehicle 11. As a result, even if the attitude of the vehicle 11 changes, favorable operability for opening and closing the door 14 can be achieved with a simple apparatus configuration.

When the attitude of the vehicle 11 including front-back and left-right tilts changes, the magnitude of gravity acting on the door 14 changes depending on whether the openness degree Odr of the door 14 is large or small. In other words, there is a close relation between the openness degree Odr of the door 14 and the operability for opening and closing the door 14.

Thus, the corrector 43 belonging to the target assisting power computer 37 may be configured to make a correction by adjusting one or both of the standard assisting power Psd and the amount of decrease correction based on information on the attitude of the vehicle 11 including front-back and left-right tilts and on the openness degree Odr of the door 14.

With such a configuration, even if the attitude of the vehicle 11 changes, the affect that the attitude change of the vehicle 11 has on the operability for opening and closing the door 14 can be reduced, and also, the affect that the openness degree Odr of the door 14 at that time has on the operability for opening or closing the door 14 can be reduced. As a result, operability for opening and closing the door 14 can be made to be even more favorable.

The controller 39 performs driving control for the door actuator 19 based on the target assisting power Ptg, which is the computation result obtained by the target assisting power computer 37. Favorable operability for opening and closing the door 14 is thus achieved with a simple apparatus configuration.

Further, the controller 39 performs control so that the driving of the door actuator 19 stops once the opening and closing velocity Vdr of the door 14 falls below the predetermined velocity threshold Vdrth. Stopping the driving of the door actuator 19 once the opening and closing velocity Vdr of the door 14 falls below the predetermined velocity threshold Vdrth helps prevent a situation where the operator may experience a strange feeling as if the door 14 is coasting against their will.

[Operation of Door Opening and Closing Assisting Apparatus 10]

Figure 4:
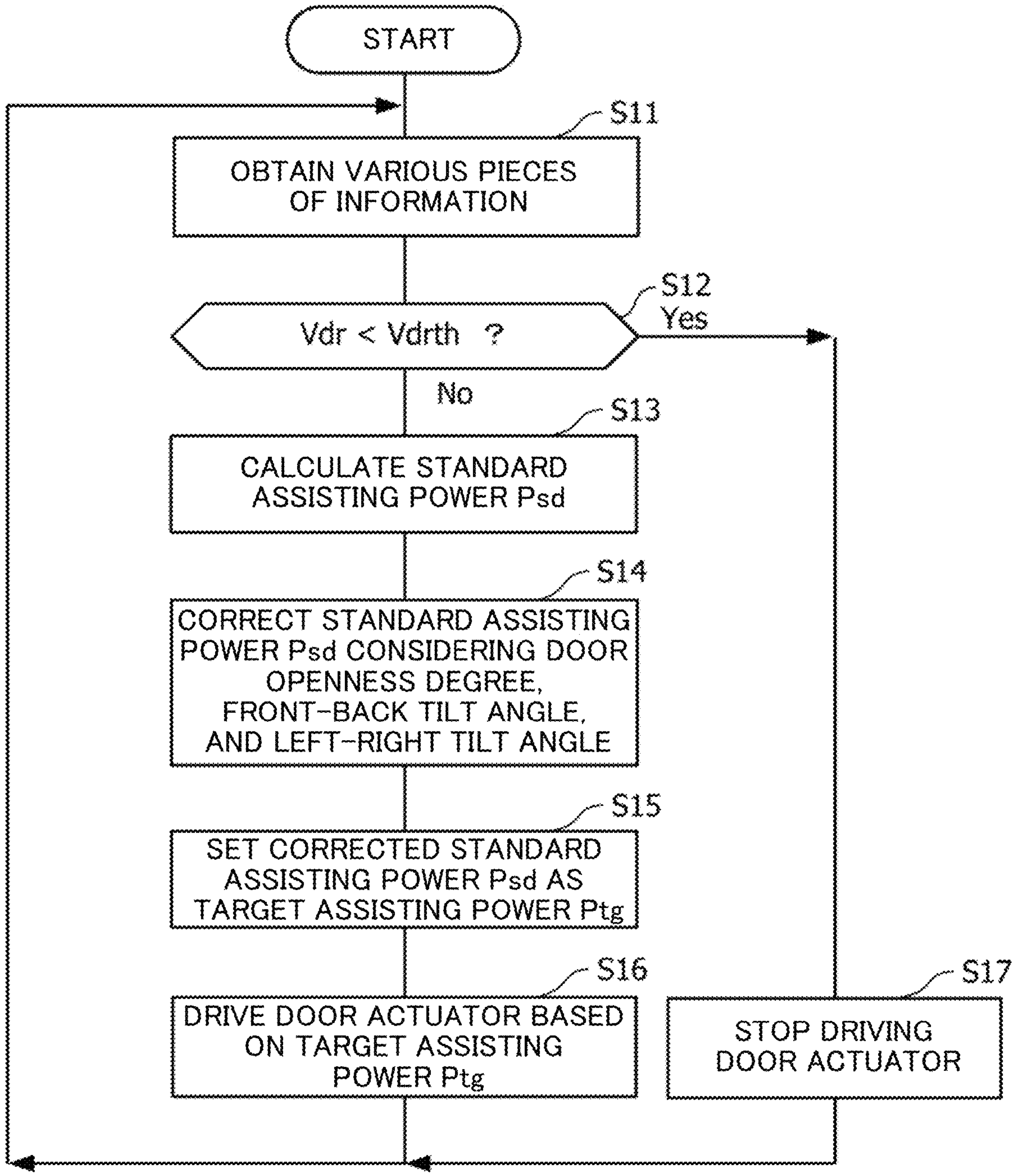
FIG. 4 is a flowchart used to describe the operation of the door opening and closing assisting apparatus according to the embodiment of the present invention.

Next, the operation of the door opening and closing assisting apparatus 10 according to the embodiment of the present invention is described with reference to FIG. 4. FIG. 4 is a flowchart used to describe the operation of the door opening and closing assisting apparatus 10 according to the embodiment of the present invention.

The following premises are made: the door 14 of the vehicle 11 is operated to be open, the door 14 is positioned upward (for example, the right door of the vehicle 11 that is tilted leftward), and the vehicle 11 has a front rising attitude (directed in the climbing direction on a slope).

In Step S11 shown in FIG. 4, the information obtainer 33 belonging to the door ECU 28 obtains chronological information on the opening and closing velocity Vdr and the openness degree Odr of the door 14 based on output signals from the Hall sensor 31 as well as on chronological information on the front-back tilt angle Afb and the left-right tilt angle Alr based on output signals from the tilt sensor 32.

In Step S12, the determiner 35 belonging to the door ECU 28 determines whether the opening and closing velocity Vdr of the door 14 is below a predetermined velocity threshold Vdrth.

If it is determined in Step S12 that the opening and closing velocity Vdr of the door 14 is equal to or above the predetermined velocity threshold Vdrth, the door ECU 28 proceeds to the next Step S13.

Meanwhile, if it is determined in Step S12 that the opening and closing velocity Vdr of the door 14 is below the predetermined velocity threshold Vdrth, the door ECU 28 jumps to Step S17.

In Step S13, based on the opening and closing velocity Vdr of the door 14 obtained by the information obtainer 33, the standard assisting power calculator 41 of the target assisting power computer 37 belonging to the door ECU 28 calculates a standard assisting power Psd which is assisting power required to maintain the opening and closing velocity Vdr.

In Step S14, the corrector 43 of the target assisting power computer 37 belonging to the door ECU 28 corrects the standard assisting power Psd considering the door openness degree Odr, the front-back tilt angle Afb, and the left-right tilt angle Alr.

In Step S15, the target assisting power computer 37 belonging to the door ECU 28 sets the standard assisting power Psd which has been corrected in Step S14, as the target assisting power Ptg. In the present embodiment, the target assisting power computer 37 sets the standard assisting power Psd corrected taking the above-described premises into account as the target assisting power Ptg.

In Step S16, the controller 39 belonging to the door ECU 28 performs driving control for the door actuator 19 based on the target assisting power Ptg, which is a computation result obtained by the target assisting power computer 37. Consequently, favorable operability for opening and closing the door 14 can be achieved with a simple apparatus configuration.

After the processing in Step S16 ends, the door ECU 28 returns to Step S11 and repeats the subsequent processing.

When the opening and closing velocity Vdr of the door 14 falls below the predetermined velocity threshold Vdrth, in Step S17, the controller 39 belonging to the door ECU 28 performs control to stop driving of the door actuator 19. Stopping driving of the door actuator 19 once the opening and closing velocity Vdr of the door 14 falls below the predetermined velocity threshold Vdrth can help prevent a situation where the operator may experience a strange feeling as if the door 14 is coasting against their will.

After the processing in Step S17 ends, the door ECU 28 returns to Step S11 and repeats the subsequent processing.

[Advantageous Effects by Door Opening and Closing Assisting Apparatus 10]

Next, advantageous effects offered by the door opening and closing assisting apparatus according to the embodiment of the present invention are described.

A door opening and closing assisting apparatus based on a first aspect is on the basis of the door opening and closing assisting apparatus 10 that assists an opening and closing operation of the door 14 on the vehicle 11.

The door opening and closing assisting apparatus 10 based on the first aspect includes the information obtainer 33 that obtains information on the opening and closing velocity Vdr of the door 14, the door actuator 19 that performs driving for assisting the opening and closing operation of the door 14, the target assisting power computer 37 that computes the target assisting power Ptg for assisting the opening and closing operation of the door 14, and the controller 39 that performs driving control for the door actuator 19 based on the target assisting power Ptg.

The target assisting power computer 37 is configured to calculate, based on the opening and closing velocity Vdr of the door 14 obtained by the information obtainer 33, the standard assisting power Psd which is assisting power required to maintain the opening and closing velocity Vdr, make a correction by decreasing the calculated standard assisting power Psd according to a predetermined rule, and set the standard assisting power Psd after the decrease correction as the target assisting power Ptg.

In the door opening and closing assisting apparatus 10 based on the first aspect, the target assisting power computer 37 calculates the standard assisting power Psd based on the opening and closing velocity Vdr of the door 14 obtained by the information obtainer 33, makes a correction by decreasing the calculated standard assisting power Psd according to a predetermined rule, and sets the standard assisting power Psd after the decrease correction as the target assisting power Ptg. When performing an opening and closing operation of the door 14, an occupant can actually feel, with a certain response, that the door 14 is opened and closed in accordance with their will because of the moderate assisting power.

According to the door opening and closing assisting apparatus 10 based on the first aspect which calculates the standard assisting power Psd based on the opening and closing velocity Vdr of the door 14, makes a correction by decreasing the calculated standard assisting power Psd according to a predetermined rule, and sets the standard assisting power Psd after the decrease correction as the target assisting power Ptg, favorable operability for opening and closing the door 14 can be achieved with a simple apparatus configuration.

In addition, a door opening and closing assisting apparatus 10 based on a second aspect is the door opening and closing assisting apparatus 10 based on the first aspect which may be configured as follows: the door opening and closing assisting apparatus 10 further comprises the determiner 35 that determines the direction of the opening and closing operation of the door 14, and the target assisting power computer 37 makes a correction so that an amount of the decrease correction may be smaller for a closing operation of the door 14 than for an opening operation of the door 14.

As shown in, for example, (a) and (b) of FIG. 3A in contradistinction, the door opening and closing assisting apparatus 10 based on the second aspect makes a correction so that the amount of the decrease correction may be smaller for a closing operation of the door 14 than for an opening operation of the door 14.

According to the door opening and closing assisting apparatus 10 based on the second aspect which makes a correction so that the amount of the decrease correction may be smaller for a closing operation of the door 14 than for an opening operation of the door 14, a situation where the door 14 hits the next vehicle in the opening operation of the door 14 is less likely to occur, and also, an experience of speedy closing of the door 14 can be offered in the closing operation of the door 14.

In addition, a door opening and closing assisting apparatus 10 based on a third aspect is the door opening and closing assisting apparatus 10 based on the first or second aspect which may be configured as follows: the determiner 35 further determines whether the opening and closing velocity Vdr of the door 14 is below the predetermined velocity threshold Vdrth, and the controller 39 performs control to stop the driving of the door actuator 19 when the opening and closing velocity Vdr of the door 14 falls below the predetermined velocity threshold Vdrth.

If assisting power from the door actuator 19 continues to be applied until the opening and closing velocity Vdr of the door 14 becomes zero, the occupant may experience a strange feeling as if the door 14 is coasting against their will.

Thus, in the door opening and closing assisting apparatus 10 based on the third aspect, the controller 39 performs control to stop the driving of the door actuator 19 when the opening and closing velocity Vdr of the door 14 falls below the predetermined velocity threshold Vdrth (except for zero).

According to the door opening and closing assisting apparatus 10 based on the third aspect which stops the driving of the door actuator 19 when the opening and closing velocity Vdr of the door 14 falls below the predetermined velocity threshold Vdrth, a situation where an occupant experiences a strange feeling as if the door 14 is coasting against their will can be avoided.

A door opening and closing assisting apparatus 10 based on a fourth aspect is the door opening and closing assisting apparatus 10 based on the first or second aspect which may be configured as follows: the door is a swing door 14 that opens and closes, pivotally supported by the hinge mechanisms 13A, 13B provided on the vehicle body 20 of the vehicle 11, the information obtainer 33 further obtains information on the attitude of the vehicle 11 including the front-back and left-right tilts, and the target assisting power computer 37 makes a correction by adjusting one or both of the standard assisting power Psd and the amount of the decrease correction based on the attitude of the vehicle 11.

According to the door opening and closing assisting apparatus 10 based on the fourth aspect in which the target assisting power computer 37 makes a correction by adjusting one or both of the standard assisting power Psd and the amount of the decrease correction based on the attitude of the vehicle 11, even if the attitude of the vehicle 11 changes, the affect that this attitude change has on the operability for opening and closing the door 14 can be reduced.

In addition, a door opening and closing assisting apparatus 10 based on a fifth aspect is the door opening and closing assisting apparatus 10 based on the first or second aspect which may be configured as follows: the door is a swing door 14 that opens and closes, pivotally supported by the hinge mechanisms 13A, 13B provided on the vehicle body 20 of the vehicle 11, the information obtainer 33 further obtains information on the attitude of the vehicle 11 including the front-back and left-right tilts and information on the openness degree Odr of the door 14, and the target assisting power computer 37 makes a correction by adjusting one or both of the standard assisting power Psd and the amount of the decrease correction based on the attitude of the vehicle 11 and the openness degree Odr of the door 14.

According to the door opening and closing assisting apparatus 10 based on the fifth aspect in which the target assisting power computer 37 makes a correction by adjusting one or both of the standard assisting power Psd and the amount of the decrease correction based on the attitude of the vehicle 11 and the openness degree Odr of the door 14, even if the attitude of the vehicle 11 changes, the affect that this attitude change has on the operability for opening and closing the door 14 can be reduced, and also, the affect that the openness degree Odr of the door 14 at that time has on the operability for opening and closing the door 14 can be reduced. As a result, operability for opening and closing the door 14 can be made to be even more favorable.

OTHER EMBODIMENTS

A plurality of embodiments described above show examples of how the present invention is embodied. Thus, those embodiments should not be interpreted as limiting the technical scope of the present invention. The present invention can be carried out in various modes without departing from the gist thereof or main features thereof

What is claimed is:

1. A door opening and closing assisting apparatus that assists an opening and closing operation of a door on a vehicle, the door opening and closing assisting apparatus comprising:

an ECU; and a door actuator that performs driving for assisting the opening and closing operation of the door, wherein the ECU is configured to function as:

an information obtainer that obtains information on an opening and closing velocity of the door;

a target assisting power computer that computes a target assisting power for assisting the opening and closing operation of the door; and a controller that performs driving control for the door actuator based on the target assisting power, the target assisting power computer calculates, based on the opening and closing velocity of the door obtained by the information obtainer without considering an opening and closing operation power exerted on the door by an occupant of the vehicle, a standard assisting power which is assisting power required to maintain the opening and closing velocity, makes a decrease correction by decreasing the calculated standard assisting power according to a predetermined rule, and sets the target assisting power as the standard assisting power after the decrease correction, the target assisting power is calculated and corrected independently of the opening and closing operation power, the door is a swing door that opens and closes, pivotally supported by a hinge mechanism provided on a vehicle body of the vehicle, the information obtainer further obtains information on an attitude of the vehicle including front-back and left-right tilts, and the target assisting power computer adjusts one or both of the standard assisting power and an amount of the decrease correction based on the attitude of the vehicle.

2. A door opening and closing assisting apparatus that assists an opening and closing operation of a door on a vehicle, the door opening and closing assisting apparatus comprising:

an ECU; and a door actuator that performs driving for assisting the opening and closing operation of the door, wherein the ECU is configured to function as:

an information obtainer that obtains information on an opening and closing velocity of the door;

a target assisting power computer that computes a target assisting power for assisting the opening and closing operation of the door; and a controller that performs driving control for the door actuator based on the target assisting power, the target assisting power computer calculates, based on the opening and closing velocity of the door obtained by the information obtainer without considering an opening and closing operation power exerted on the door by an occupant of the vehicle, a standard assisting power which is assisting power required to maintain the opening and closing velocity, makes a decrease correction by decreasing the calculated standard assisting power according to a predetermined rule, and sets the target assisting power as the standard assisting power after the decrease correction, the target assisting power is calculated and corrected independently of the opening and closing operation power, the door is a swing door that opens and closes, pivotally supported by a hinge mechanism provided on a vehicle body of the vehicle, the information obtainer further obtains information on an attitude of the vehicle including front-back and left-right tilts and information on an openness degree of the door, and the target assisting power computer adjusts one or both of the standard assisting power and an amount of the decrease correction based on the attitude of the vehicle and the openness degree of the door.

3. The door opening and closing assisting apparatus according to claim 1, wherein the ECU is further configured to function as a determiner that determines a direction of the opening and closing operation of the door, and the target assisting power computer makes the decrease correction so that the amount of the decrease correction is smaller for a closing operation of the door than for an opening operation of the door.

4. The door opening and closing assisting apparatus according to claim 1, wherein the ECU is further configured to function as a determiner that determines whether the opening and closing velocity of the door is below a predetermined velocity threshold, and the controller performs control to stop the driving of the door actuator when the opening and closing velocity of the door falls below the predetermined velocity threshold.

5. The door opening and closing assisting apparatus according to claim 2, wherein the ECU is further configured to function as a determiner that determines a direction of the opening and closing operation of the door, and the target assisting power computer makes the decrease correction so that the amount of the decrease correction is smaller for a closing operation of the door than for an opening operation of the door.

6. The door opening and closing assisting apparatus according to claim 2, wherein the ECU is further configured to function as a determiner that determines whether the opening and closing velocity of the door is below a predetermined velocity threshold, and the controller performs control to stop the driving of the door actuator when the opening and closing velocity of the door falls below the predetermined velocity threshold.

* * * * *